United States Patent
Nagalpur et al.

(10) Patent No.: US 9,621,389 B2
(45) Date of Patent: Apr. 11, 2017

(54) METHOD TO INTRODUCE COMPLEMENTING TRAINING SYMBOLS INTO A 802.11P OFDM FRAME IN VEHICULAR COMMUNICATIONS

(71) Applicant: VOLVO CAR CORPORATION, Gothenburg (SE)

(72) Inventors: Keerthi Nagalpur, Gothenburg (SE); Fredrik Brannstrom, Gothenburg (SE); Erik G. Strom, Kullavik (SE)

(73) Assignee: VOLVO CAR CORPORATION, Göteborg (SE)

( * ) Notice: Subject to any disclaimer, the term of this patent is extended or adjusted under 35 U.S.C. 154(b) by 0 days.

(21) Appl. No.: 15/025,399

(22) PCT Filed: Sep. 29, 2014

(86) PCT No.: PCT/EP2014/070815
§ 371 (c)(1),
(2) Date: Mar. 28, 2016

(87) PCT Pub. No.: WO2015/044424
PCT Pub. Date: Apr. 2, 2015

(65) Prior Publication Data
US 2016/0234050 A1    Aug. 11, 2016

(30) Foreign Application Priority Data
Sep. 30, 2013    (SE) .................................... 13006242

(51) Int. Cl.
*H04B 15/00*    (2006.01)
*H04L 27/26*    (2006.01)
(Continued)

(52) U.S. Cl.
CPC ........ *H04L 27/2601* (2013.01); *H04L 5/0007* (2013.01); *H04L 25/0226* (2013.01); *H04L 67/12* (2013.01); *H04W 12/02* (2013.01)

(58) Field of Classification Search
CPC ............... H04L 27/2647; H04L 5/0007; H04L 27/2657; H04L 27/2662; H04L 5/0048
(Continued)

(56) References Cited

U.S. PATENT DOCUMENTS 7,660,229 B2 * 2/2010 Papasakellariou ... H04B 7/0452
                                                        370/203
7,764,643 B2 * 7/2010 Mizusawa ............. H04L 1/0028
                                                        370/328
(Continued)

FOREIGN PATENT DOCUMENTS

| EP | 1959593 A2 | 8/2008 |
|---|---|---|
| WO | 2004042949 A1 | 5/2004 |
| WO | 2012149394 A1 | 11/2012 |

OTHER PUBLICATIONS

"IEEE standard for information technology—telecommunications and information exchange between systems local and metropolitan area networks—specific requirements part 11: Wireless LAN medium access control (MAC) and physical layer (PHY) specifications," IEEE Std 802.11-2012.*
(Continued)

*Primary Examiner* — James M Perez
(74) *Attorney, Agent, or Firm* — Gesmer Updegrove LLP

(57) ABSTRACT

The present disclosure relates to a method to introduce complementing training symbols into a 802.11p OFDM frame in vehicular communications, wherein a transmitter sends encrypted information from a first unit to a receiver of a specific second unit or a respective receiver of a number of second units and wherein fixed training symbols, which are implemented in a transmitter chip, are multiplexed with
(Continued)

the information and transmitted to the receiver for channel estimation at the receiver side. In order to improve channel estimation complementing training symbols are inserted at the transmitter side immediately after an LLC sub-layer, where the LLC sub-layer is software defined and can be modified. It also relates to a receiver for exploiting the inserted complementing training symbols in order to improve channel estimation in 802.11 p OFDM vehicular communications, which is arranged to reproduce the complementing training symbols inserted in accordance with the method.

7 Claims, 12 Drawing Sheets

(51) Int. Cl.
H04L 25/02 (2006.01)
H04L 5/00 (2006.01)
H04L 29/08 (2006.01)
H04W 12/02 (2009.01)

(58) Field of Classification Search
USPC .................................. 375/259–285, 295–352
See application file for complete search history.

(56) References Cited

U.S. PATENT DOCUMENTS

| | | | |
|---|---|---|---|
| 7,904,093 B2* | 3/2011 | Nystrom | H04L 5/0048 370/442 |
| 8,045,657 B2* | 10/2011 | Xiang | H04L 27/2657 375/260 |
| 8,111,790 B2* | 2/2012 | Farrokhi | H04B 17/345 375/148 |
| 8,325,844 B2* | 12/2012 | Walton | H04B 7/0417 375/130 |
| 8,332,896 B2* | 12/2012 | Shelby | H04L 65/4076 714/751 |
| 8,347,339 B2* | 1/2013 | Shelby | H04L 5/0048 370/465 |
| 8,407,551 B2* | 3/2013 | Brannstrom | H03M 13/11 714/752 |
| 8,433,005 B2* | 4/2013 | Gupta | H04L 27/2656 370/509 |
| 8,559,537 B2* | 10/2013 | Fernandez | H04L 25/0206 375/260 |
| 8,843,142 B2* | 9/2014 | Nishio | H04L 5/0007 370/208 |
| 8,885,740 B2* | 11/2014 | Zhang | H04L 1/0046 375/260 |
| 2004/0128605 A1* | 7/2004 | Sibecas | H04L 5/0007 714/746 |
| 2005/0030886 A1* | 2/2005 | Wu | H04J 11/0023 370/206 |
| 2006/0146948 A1* | 7/2006 | Park | H04L 5/0048 375/260 |
| 2006/0222094 A1* | 10/2006 | Makhlouf | H04L 25/0224 375/260 |
| 2007/0053282 A1* | 3/2007 | Tong | H04B 7/04 370/208 |
| 2007/0104174 A1* | 5/2007 | Nystrom | H04L 5/0048 370/343 |
| 2007/0183519 A1* | 8/2007 | Dang | H04L 5/0048 375/260 |
| 2007/0230324 A1* | 10/2007 | Li | H04W 72/044 370/204 |
| 2008/0165734 A1* | 7/2008 | Hart | H04L 5/0048 370/330 |
| 2008/0219360 A1* | 9/2008 | Hekmann | H04L 25/022 375/260 |
| 2008/0253279 A1* | 10/2008 | Ma | H04B 7/0684 370/206 |
| 2008/0310536 A1* | 12/2008 | Patel | H04L 25/0232 375/260 |
| 2009/0003466 A1* | 1/2009 | Taherzadehboroujeni | H04B 7/0669 375/260 |
| 2009/0067518 A1* | 3/2009 | Melis | H04L 25/0232 375/260 |
| 2009/0080576 A1* | 3/2009 | Xiang | H04L 27/2675 375/344 |
| 2009/0082002 A1* | 3/2009 | Kim | H04B 17/345 455/418 |
| 2009/0175370 A1* | 7/2009 | Kuroda | H04L 5/005 375/260 |
| 2009/0196165 A1* | 8/2009 | Morimoto | H04J 11/0079 370/208 |
| 2009/0201860 A1* | 8/2009 | Sherman | H04L 12/1881 370/329 |
| 2009/0201902 A1* | 8/2009 | Miki | H04W 88/08 370/342 |
| 2009/0274174 A1* | 11/2009 | Hwang | H04W 72/0406 370/480 |
| 2009/0279589 A1* | 11/2009 | Nguyen | H04L 5/0023 375/141 |
| 2010/0008443 A1* | 1/2010 | Casamajou | H04L 27/2647 375/267 |
| 2010/0238787 A1* | 9/2010 | Guey | H04L 5/0048 370/208 |
| 2011/0096816 A1* | 4/2011 | Siti | H04L 25/0204 375/219 |
| 2011/0261781 A1* | 10/2011 | Vrzic | H04W 74/004 370/330 |
| 2011/0280325 A1* | 11/2011 | Fernandez | H04L 25/0206 375/260 |
| 2012/0140835 A1* | 6/2012 | Czink | H04L 27/2605 375/260 |
| 2013/0114756 A1* | 5/2013 | Jia | H04J 11/00 375/295 |
| 2014/0079109 A1* | 3/2014 | Serbetli | H04L 25/067 375/224 |
| 2014/0241444 A1* | 8/2014 | Li | H04L 1/0026 375/260 |
| 2015/0078494 A1* | 3/2015 | Talvitie | H04L 25/024 375/346 |
| 2015/0085735 A1* | 3/2015 | Shelby | H04L 65/80 370/312 |
| 2015/0180629 A1* | 6/2015 | Lorca Hernando | H04J 11/00 370/330 |
| 2015/0215085 A1* | 7/2015 | Xu | H04W 4/06 370/312 |
| 2016/0036613 A1* | 2/2016 | Mun | H04L 1/00 714/776 |
| 2016/0127093 A1* | 5/2016 | Jiang | H04L 5/0051 370/330 |
| 2016/0205664 A1* | 7/2016 | Zhang | H04L 5/00 370/312 |
| 2016/0359600 A1* | 12/2016 | Krzymien | H04L 5/0048 |

OTHER PUBLICATIONS

International Search Report and Written Opinion mailed on Jan. 1, 2015 in connection with related International patent application No. PCT/EP2014/070815, 8 pages.

International Preliminary Report on Patentability mailed on Sep. 1, 2015 in connection with related International patent application No. PCT/EP2014/070815, 8 pages.

Nagalapur, Keerthi et al. "On channel estimation for 802.11p in highly time-varying vehicular channels", 2014 IEEE International Conference on Communications (ICC), IEEE, Jun. 10, 2014, pp. 5659-5664.

Grünheid, Rainer et al. "Robust channel estimation in wireless LANs for mobile environments." Vehicular Technology Conference, 2002. Proceedings. VTC 2002-Fall. 2002 IEEE 56th. vol. 3. IEEE, 2002, pp. 1545-1549.

(56) References Cited

OTHER PUBLICATIONS

Kim, Sang In, et al. "Mid-amble aided OFDM performance analysis in high mobility vehicular channel." Intelligent Vehicles Symposium, 2008 IEEE. IEEE, 2008., pp. 751-754.

Cho, Woong, et al. "Performance evaluation of V2V/V2I communications: the effect of midamble insertion." Wireless Communication, Vehicular Technology, Information Theory and Aerospace & Electronic Systems Technology, 2009. Wireless VITAE 2009. 1st International Conference on. IEEE, 2009, pp. 793-797.

* cited by examiner procedure INSERTPT(FB, PTb, $N_{DBPS}$, $M'_P$)

$$M'_S = \max(\lceil (N_{SERV} + N_{MACH} + N_{MEM})/N_{DBPS}\rceil + 1, M'_P)$$
$$N_S = (N_{DBPS} \cdot (M'_S - 1)) - N_{SERV} - N_{MACH} - N_{MEM}$$

if $N_{FB} \geq N_S$ then
    Group the first $N_S$ bits of FB in block FBS.

$$\text{Compute: } N_P = (N_{DBPS} \cdot M'_P) - N_{MEM}$$
$$Q = \lfloor (N_{FB} - N_S)/N_P \rfloor$$

if $Q \neq 0$ then
        Group the subsequent bits of FB into $Q$ blocks of
        $N_P$ bits each and denote the blocks as $FB_1, FB_2, ..., FB_Q$.
    end if if $(N_{FB} - N_S - (Q \cdot N_P)) > N_{DBPS}$ then $$M'_A = \lfloor (N_{FB} - N_S - (Q \cdot N_P))/N_{DBPS} \rfloor$$
$$N_A = (M'_A \cdot N_{DBPS}) - N_{MEM}$$
$$A = 1$$

Group the next $N_A$ bits of FB into the block FBA.
    else
        $M'_A = 0; N_A = 0; A = 0$
    end if $$\text{Compute: } N_E = N_{FB} - N_S - (Q \cdot N_P) - N_A$$

else
    The length of the frame is short, transmit an SF.
    Go to end procedure
end if

- Group the last $N_E$ bits in block FBE.
- Insert the binary sequence PTb in between the blocks formed in the above steps as shown in Fig. 5.
- Pad zeros to the resulting sequence of bits if necessary to make the length of the sequence an integer multiple of octets.
- Denote the sequence as Modified FB, which is passed down to MAC layer in Fig. 3.

end procedure

Fig. 12

METHOD TO INTRODUCE COMPLEMENTING TRAINING SYMBOLS INTO A 802.11P OFDM FRAME IN VEHICULAR COMMUNICATIONS

PRIORITY INFORMATION

The present application is a 371 Application No. PCT/EP2014/070815 filed on Sep. 29, 2014 that claims priority to Swedish Application No. 1300624-2 filed on Sep. 30, 2013. Both applications are incorporated herein by reference in their entireties.

FIELD OF THE INVENTION

This invention is in general related to wireless communication and in particular to vehicular communication using 802.11p. More specifically the invention is related to a method to introduce complementing training symbols into a 802.11p Orthogonal Frequency-Division Multiplexing (OFDM) frame, wherein a transmitter sends encrypted information from a first unit to a receiver of a specific second unit or a respective receiver of a number of second units and wherein fixed training symbols, which are implemented in a transmitter chip, are multiplexed with the information and transmitted to the receiver for channel estimation at the receiver side.

BACKGROUND OF THE INVENTION

IEEE 802.11p has been chosen as the standard for vehicular communications, which is identical to the widely used 802.11a. In 802.11p a default channel spacing of 10 MHz is proposed as opposed to the commonly used 20 MHz spacing in 802.11a to provide better protection against longer delay spreads. It has been shown in "C. Mecklenbräuker, A. Molisch, J. Karedal, F. Tufvesson, A. Paier, L. Bernadó, T. Zemen, O. Klemp, and N. Czink, "Vehicular channel characterization and its implications for wireless system design and performance," Proceedings of the IEEE, vol. 99, no. 7, pp. 1189-1212, 2011." and "T. Zemen, L. Bernadó, N. Czink, and A. Molisch, "Iterative time-variant channel estimation for 802.11p using generalized discrete prolate spheroidal sequences," IEEE Transactions on Vehicular Technology, vol. 61, no. 3, pp. 1222-1233, 2012.", that the length of the cyclic prefix (CP) and sub-carrier spacing satisfy the design guidelines of an OFDM system for the measured vehicular channels (values of delay, Doppler spreads). However, the training data in 802.11p originally designed for 802.11a is designed for relatively static devices and indoor use. In vehicular communications large vehicular velocities, dynamic environment, and long packet sizes of around 400 bytes mean that the channel impulse response can change significantly within one OFDM frame, see e.g. "L. Bernadó, T. Zemen, F. Tufvesson, A. Molisch, and C. Mecklenbräuker, "Delay and doppler spreads of non-stationary vehicular channels for safety relevant scenarios," IEEE Transactions on Vehicular Technology, no. 99, 2013.". Robust channel estimates for the whole frame are required for ensuring desired low Frame Error Rates (FER) for traffic safety application.

To address the high frame error rate due to non-robust channel estimation, solutions using iterative methods and post-ambles have been proposed by "T. Zemen, L. Bernadó, N. Czink, and A. Molisch, "Iterative time-variant channel estimation for 802.11p using generalized discrete prolate spheroidal sequences," IEEE Transactions on Vehicular Technology, vol. 61, no. 3, pp. 1222-1233, 2012."

To the best of authors' knowledge the MAC and PHY layer functionalities of an 802.11p transceiver are implemented in the chip and the layers above them are software defined which can be modified with a software update. Also, since 802.11p uses outside the context of a basic service set communication, encryption and authentication are not performed by the MAC layer. As a consequence the data from the layer above the MAC layer enters the PHY layers unchanged with the addition of headers and CRC-32 checksum of fixed lengths.

System Model and 802.11p Frame Structure

The physical layer of 802.11p uses orthogonal frequency-division multiplexing (OFDM) with N=64 subcarriers and a CP of length $N_{CP}=16$. Among the 64 subcarriers, 48 are allocated for data, 4 are allocated for pilots and 12 are null subcarriers. A channel spacing of 10 MHz results in OFDM symbol duration of $T_{SYM}=8$ μs which includes a cyclic prefix of 1.6 μs. 802.11p standard supports eight different modulation and coding schemes, see e.g. ""IEEE standard for information technology—telecommunications and information exchange between systems local and metropolitan area networks—specific requirements part 11: Wireless LAN medium access control (MAC) and physical layer (PHY) specifications," IEEE Std 802.11-2012, pp. 1-2793, 2012, Table 18.4"; the scheme with QPSK mapping and code rate 1/2 is adapted for the safety applications and is important to take into consideration.

The known encoding process of an 802.11 OFDM symbol is illustrated in FIG. 1, which illustrates a block diagram of an 802.11p transmitter. Data bits are scrambled and encoded using a rate 1/2, $(171_8, 133_8)$ convolutional code. Higher coding rates are achieved using puncturing. The encoded bits are divided into groups of $N_{CBPS}$ bits, where $N_{CBPS}$ is the number of coded bits per OFDM symbol. Bits in each group are interleaved using a two stage interleaver. The interleaved bits are mapped to the constellation $c$ resulting in complex valued symbols. The complex valued symbols and the pilots are mapped to the data subcarriers and the pilot subcarriers of an OFDM symbol, respectively. Following which, an N-point inverse Discrete Fourier Transform (DFT) is performed to obtain time-domain signal and a cyclic prefix of $N_{CP}$ samples is added to form an OFDM symbol. For specific details of the various blocks in the transmitter the readers are referred to ""IEEE standard for information technology—telecommunications and information exchange between systems local and metropolitan area networks—specific requirements part 11: Wireless LAN medium access control (MAC) and physical layer (PHY) specifications," IEEE Std 802.11-2012, pp. 1-2793, 2012.", Ch. 18".

Assigning the data symbol positions to the set $\mathcal{D}$ and the pilot positions to the set $\mathcal{P}$, the frequency-domain symbol mapped to the kth subcarrier in the mth OFDM symbol is given by $$S[m,k]=D[m,k]+P[m,k]$$

where D[m, k] and P[m, k] are the data and the pilot symbols respectively at the kth subcarrier in the mth OFDM symbol, such that P[m,k]=0, $\forall[m,k]\in \mathcal{D}$ and D[m,k]=0, $\forall[m,k]\in \mathcal{P}$. The time-domain samples obtained after the N-point inverse DFT is given by $$s[m,n]=\text{IDFT}_N(S[m,k])$$

Consider the wireless channel with a discrete-time impulse response given by $$h[n]=\Sigma_{l=0}^{L-1}\alpha_l\delta[n-\tau_l],$$

where $\alpha_l$ is the complex path gain of the lth tap, $\tau_l$ is the delay of the lth tap and L is the total number of taps. Assuming that the maximum excess delay of the wireless channel is shorter than the length of the cyclic prefix and the channel impulse response does not change during transit time of one OFDM symbol, the received samples of the mth OFDM symbol after discarding the CP can be expressed as $$r[m,n]=s[m,n]\otimes_N h[n]+w[m,n],$$

Where $\otimes$ is the N-point circular convolution, w[n] are independent and identically distributed (iid) time-domain complex AWGN samples with zero mean and variance $\sigma_{wt}^2$. The frequency-domain symbols carried by the sub-carriers after the N-point DFT operation at the receiver are given by $$R[m,k]=DFT_N(r[m,n])$$

$$R[m,k]=H[m,k]S[m,k]+W[m,k]$$

where, H[m, k] is the channel frequency response at the kth sub-carrier of mth OFDM symbol and W[m, k] are the frequency domain complex AWGN samples with mean zero and variance $\sigma_{wt}^2$. The IDFT and DFT operations are suitably scaled to preserve the energy of the signal.

Since the vehicular channels are time varying, the channel impulse response varies within one OFDM symbol resulting in inter carrier interference (ICI) which is not included in the above described model. However, the effect of ICI introduced due to channel variations within one OFDM symbol on the performance of the system is small and is neglected.

A. 802.11p Frame

FIG. 2 shows a standard 802.11p frame in subcarrier-time grid showing the position of the pilots and the data symbols. A frame begins with two identical OFDM symbols referred to as long training (LT) symbols. SIGNAL symbol carries the information regarding the length of the packet and the modulation and coding scheme used. SIGNAL is always encoded using the rate 1/2, ($171_8$, $133_8$) convolutional code without puncturing and uses BPSK signaling. SIGNAL field is followed by the OFDM symbols corresponding to the data. A sequence of 10 identical short symbols spanning over duration of $2T_{SYM}$ is prefixed to the frame (not shown in the figure), this sequence is used at the receiver for signal detection and synchronization. The number of OFDM symbols in the standard frame beginning with the two LT symbols is denoted as M.

A generic non-iterative receiver for decoding the 802.11p frames is shown in FIG. 3. Perfect frequency and sampling synchronization is assumed. The CP of the OFDM symbol is discarded and an N-point DFT is performed to obtain the frequency domain symbols. The frequency domain symbols are input to the channel estimation block. The channel estimation block uses the received symbols and the inserted pilot symbols to obtain the channel estimates $\hat{H}[m,k]$ for the whole frame. Channel equalization is performed using a Minimum Mean-Square Error (MMSE) equalizer; the output of the equalizer is given by $$\hat{S}[m,k]=\frac{R[m,k]\hat{H}*[m,k]}{\sigma_{wf}^2+|\hat{H}[m,k]|^2}.$$

The equalized symbols $\hat{S}[m, k]$ are then input to the chain of demodulator, deinterleaver, decoder, and descrambler.

OBJECTS

The object with the invention is to avoid the channel estimation problem in a vehicular communication system using an 802.11p transceiver.

SUMMARY OF THE INVENTION

The objects are obtained by the invention defined in the enclosed claims.

According to the invention use of cross layered approach is made to insert complementing training bits into the data packet in the higher layers. A modified receiver can use these known complementing bits for improved channel estimation using well established channel estimation methods. A standard receiver sees the complementing bits as part of the data and passes it to the higher layers, where the complementing bits can be removed. A standard receiver requires a simple software update in the higher layers to discard the complementing data, making our scheme backward compatible with the added requirement of a software update. We also show an implementation of the receiver which makes use of the inserted training bits for robust channel estimation. A modified packet with inserted training bits can be indicated by using the reserved bit in the SIGNAL field of the 802.11p frame.

More specifically a method to insert complementing training symbols in the standard 802.11p frame in the higher layers is proposed and a receiver for the resulting modified frame is described. Simulation results show that the combination of the proposed modified frame and the receiver gives FER performance which follows the performance of the standard receiver with perfect channel estimates in parallel without saturation with increase in SNR.

Safety related applications are being widely tested using software defined radio implementations of 802.11p. The modified frame and receiver according to the invention can be easily implemented starting from the 802.11p implementations.

The results show that periodically inserted OFDM training symbols in an 802.11p frame can provide good FER performance with a non iterative receiver and as a consequence such a pattern of training data can be a possibility for the future revisions of 802.11p for vehicular communications.

This is provided through a method to introduce complementing training symbols into a 802.11p Orthogonal Frequency-Division Multiplexing (OFDM) frame in vehicular communications, wherein a transmitter sends encrypted information from a first unit to a receiver of a specific second unit or a respective receiver of a number of second units and wherein fixed training symbols, which are implemented in a transmitter chip, are multiplexed with the information and transmitted to the receiver for channel estimation at the receiver side, and in order to improve channel estimation the complementing training symbols are inserted at the transmitter side immediately after an logical link control (LLC) sub-layer, where the logical link control (LLC) sub-layer is software defined and can be modified.

The provision of complementing training symbols provide for improved Frame Error Rate (FER) performance and makes close to perfect channel estimation obtainable.

According to a second aspect is provided that training bits of the complementing training symbols are inserted in a Frame Body data unit before passing it down to a medium access control (MAC) sub-layer.

The provision of inserting the complementing training symbols in a Frame Body data unit before passing it down to a medium access control (MAC) sub-layer provides for a backward compatible scheme where a standard receiver requires a simple software update in the higher layers to discard the complementing data whereas a new receiver can make use of the inserted training bits for robust channel estimation.

According to a third aspect is provided that training bits of length $N_{DBPS}$ equal to the number of data bits corresponding to a complete Orthogonal Frequency-Division Multiplexing (OFDM) symbol are inserted periodically in the frame to minimize an overhead of termination and insert training data.

The provision of inserting training bits of length $N_{DBPS}$ equal to the number of data bits corresponding to a complete Orthogonal Frequency-Division Multiplexing (OFDM) symbol periodically in the frame provides for minimizing the overhead of termination and insert training data which facilitates robust channel estimation for the frame.

According to a fourth aspect is provided that one complementing training symbol is inserted after the periodically inserted training bits.

The provision of inserting one complementing training symbol after the periodically inserted training bits provides for sufficient complementing training symbols for the final OFDM symbols.

According to a fifth aspect is provided that the training bits inserted in the logical link control (LLC) sub-layer are scrambled at the physical (PHY) layer by a scrambler initialized with a pseudo-random seed.

The provision of scrambling the training bits inserted in the logical link control (LLC) sub-layer at the physical (PHY) layer by a scrambler initialized with a pseudo-random seed enables reproduction of the inserted complementing training symbols at a receiver side.

According to a sixth aspect is provided a receiver for exploiting the inserted complementing training symbols in order to improve channel estimation in 802.11p Orthogonal Frequency-Division Multiplexing (OFDM) vehicular communications, which is arranged to reproduce the complementing training symbols inserted at the transmitter side in accordance with the above method.

The provision of a receiver arranged to reproduce the complementing training symbols inserted at the transmitter side in accordance with the above method provides for improved Frame Error Rate (FER) performance and close to perfect channel estimation.

According to a seventh aspect is provided that the receiver is arranged to use the reproduced complementing training symbols for channel estimation.

The provision of using the reproduced complementing training symbols for channel estimation provides for improved Frame Error Rate (FER) performance and close to perfect channel estimation.

According to an eight aspect is provided that a pseudo-random scrambler seed used to initialize the scrambler at the transmitter side is used for reproducing the complementing training symbols.

The provision of using a pseudo-random scrambler seed used to initialize the scrambler at the transmitter side for reproducing the complementing training symbols provides for correct reproduction of the inserted complementing training symbols at a receiver side.

BRIEF DESCRIPTION OF THE DRAWINGS

In the following, embodiments herein will be described in greater detail by way of example only with reference to attached drawings, in which

FIG. 12 illustrates the procedure to insert training bits.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PREFERRED EMBODIMENTS

Figure 4:
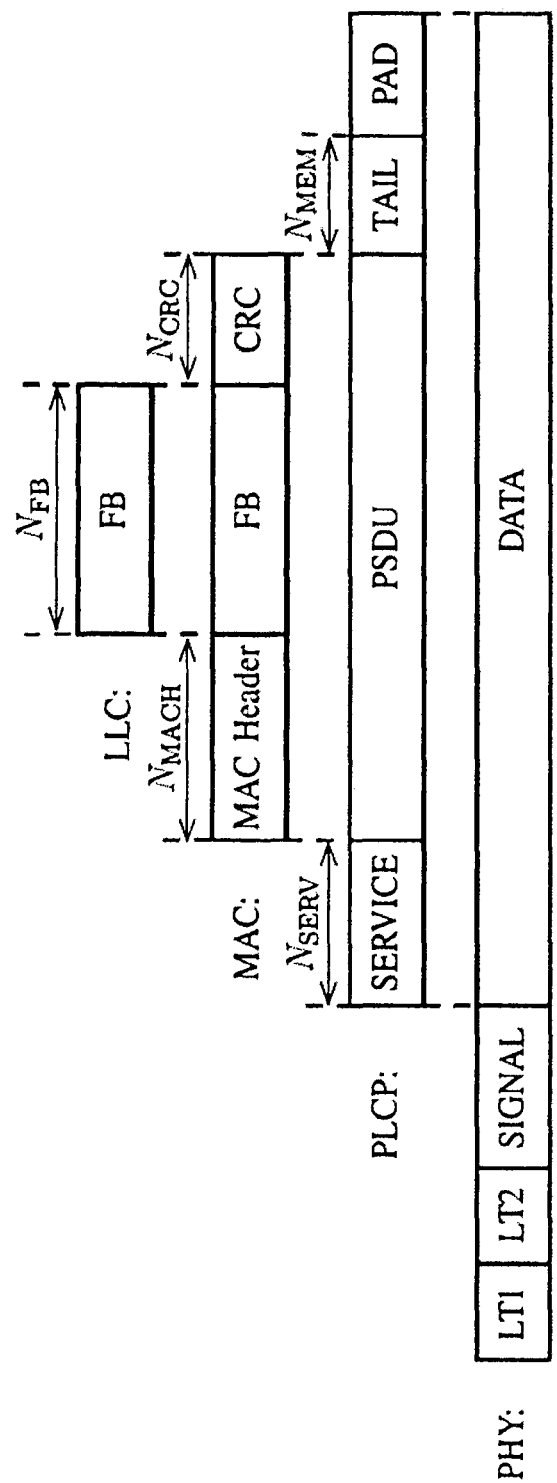
FIG. 4 is a diagram showing the flow of data bits from LLC sublayer to the physical layer.

In this section the proposed modified frame and its encoding process is described. The flow of the data from the logical link control (LLC) sub-layer to the PHY layer is shown in FIG. 4. The LLC sub-layer outputs a data unit referred to as Frame Body (FB) of length $N_{FB}$. Frame Body is passed to the MAC sub-layer, which adds a MAC header of length $N_{MACH}$=288 bits and a CRC check sum of length $N_{CRC}$=32 bits computed over the MAC header and the Frame Body to form a data unit referred to as PSDU. In the OFDM PLCP sub-layer, a SERVICE field of $N_{SERV}$=16 bits, a TAIL of $N_{MEM}$=6 zero bits and padded zero bits are added to form the DATA unit of the OFDM frame. Since the MAC sub-layer in 802.11p does not perform any encryption, the location of the Frame Body bits in DATA unit can be determined. The insertion of the complementing training bits to form the modified packet is performed immediately after the LLC sub-layer, under the assumption that the LLC sub-layer is software defined and it can be modified. The training bits are inserted in the Frame Body data unit before passing it down to the MAC sub-layer.

Figure 1:
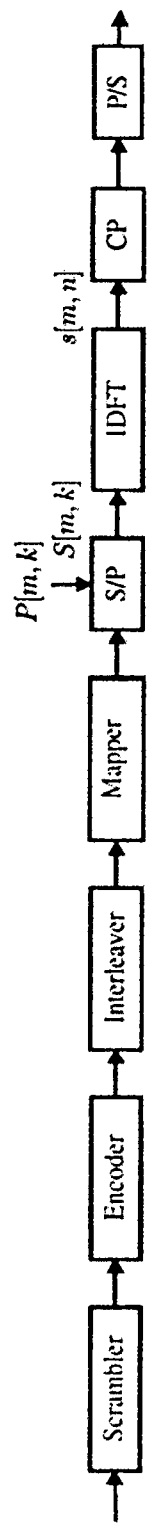
FIG. 1 shows a block diagram of a 802.11p transmitter.
Figure 2:
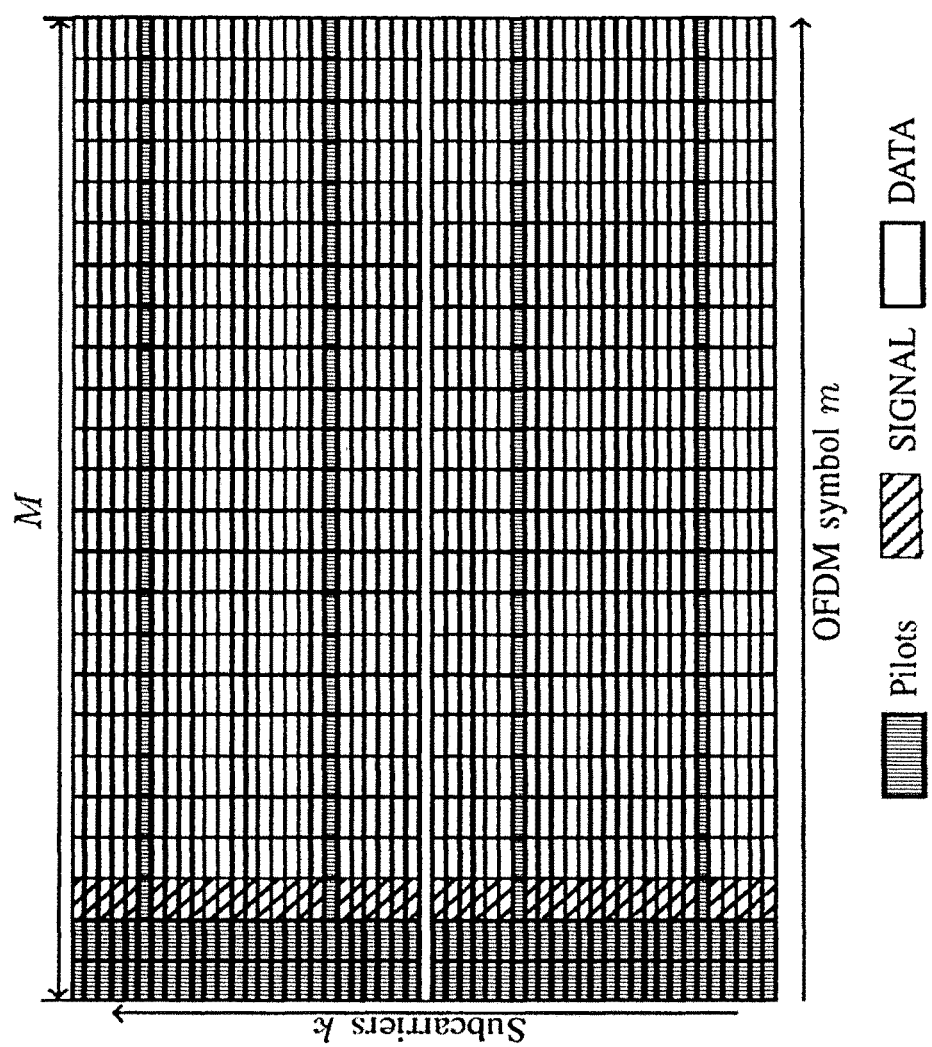
FIG. 2 shows a standard 802.11p frame in subcarrier-time grid showing the position of the pilots and the data symbols.

As illustrated in FIG. 1, the bits entering the PHY layer are passed through scrambler, convolutional encoder and interleaver. These blocks modify the input bit stream and as a consequence the resulting inserted training symbols in the modified frame are influenced by these blocks.

The training bits inserted in the LLC sub-layer are scrambled at the PHY layer. Since the scrambler is initialized with a pseudo-random seed, the training bits inserted in the upper layers are modified in a manner unknown to the LLC layer. However, the pseudo-random sequence used to initialize the scrambler is estimated at the receiver. The scrambler seed estimated at the receiver in combination with the training data bits inserted at the transmitter can be used to determine the output of scrambler at the transmitter.

The rate 1/2, ($171_8$, $133_8$) convolutional encoder has a memory of $N_{MEM}$=6 bits, as a consequence a bit output from the convolutional encoder is a function of 6 previous input bits and the input bit. To insert known training bits into the frame, the convolutional encoder is terminated in a known state before the training bits are input to the convolutional encoder. The resulting output bits are determined by the termination state and the input bits. Inserting a known training sequence of any length into the frame requires 6 complementing bits. Also the encoded bits are interleaved modifying the positions of the bits input. To minimize the overhead of termination and insert training data which facilitates robust channel estimation for the frame, we insert training bits of length $N_{DBPS}$ equal to the number of data bits corresponding to a complete OFDM symbol periodically in the frame. Inserting a complete OFDM training symbol requires the convolutional encoder to be terminated in a known state only once resulting in smaller overhead. A complete OFDM symbol as training similar to the LT symbol has the advantage of measuring the frequency selectivity across the bandwidth if the multi-path components of the wireless channel have changed significantly since the LT symbol.

Figure 5:
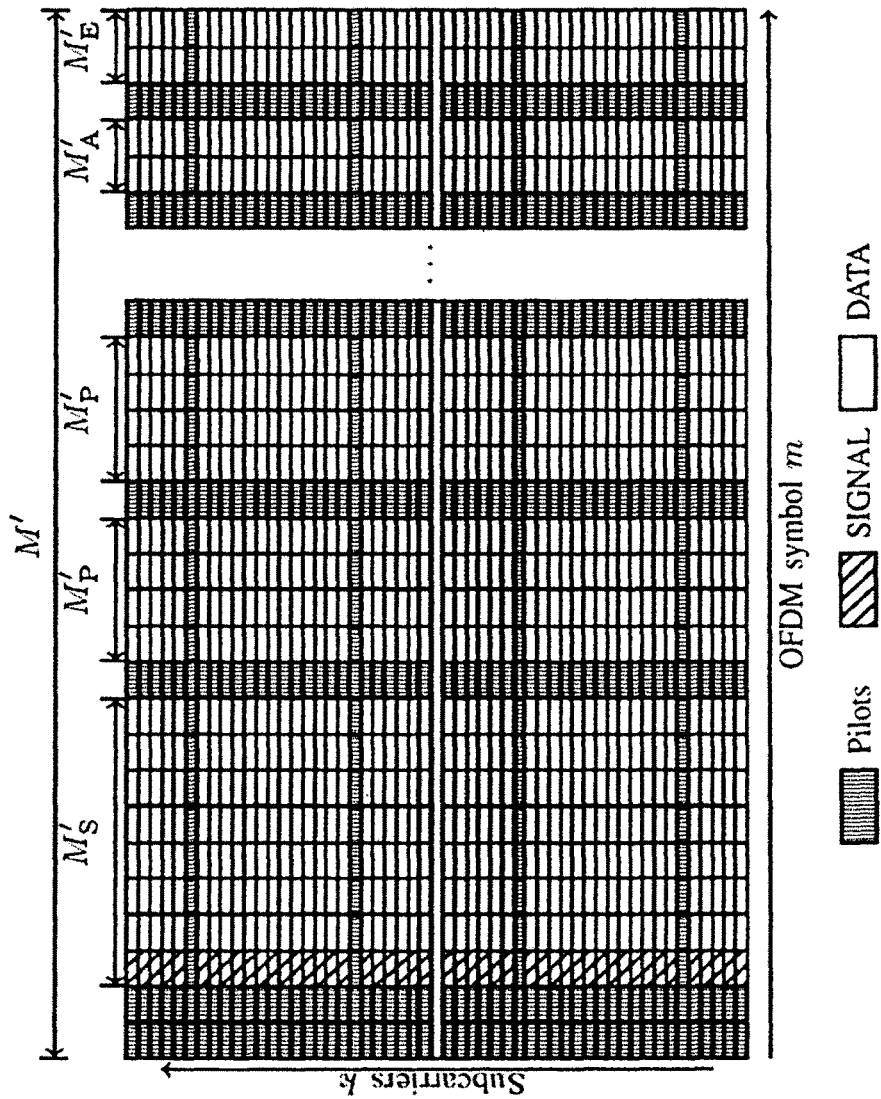
FIG. 5 shows an 802.11p frame modified according to the invention in subcarrier-time grid showing the position of the pilots and the data symbols.

FIG. 5 shows an example of the modified frame with periodically inserted OFDM training symbols. The inserted OFDM symbols will henceforth be referred to as pseudo training (PT) symbols and the number of OFDM symbols between two periodically inserted PTs as $M_P'$, which is the design parameter of a modified frame. As shown in the figure, the separation between the LT symbols and the first PT denoted as $M_S'$ can be larger than $M_P'$ due to the insertion of the MAC header and SERVICE fields by the layers below the LLC sublayer. Also, depending on the length $N_{FB}$, the frame in the end may consist of several OFDM data symbols less than $M_P'$ after the periodically inserted PTs and result in less training symbols for these final OFDM symbols. To overcome this problem one complementing PT is inserted after the periodically inserted training. The separation between the final periodically inserted PT and the complementing PT is denoted as $M_A'$. Since the CRC and the TAIL bits are appended to the end of the frame by the PHY layer, the frame will consist of $M_E'$ OFDM symbols after the final PT as shown in the figure. $M_E'$ is determined by $N_{FB}$, $M_P'$, and the MCS used. The number of OFDM symbols in the modified frame beginning with the two LT symbols is denoted as M'.

Figure 6:
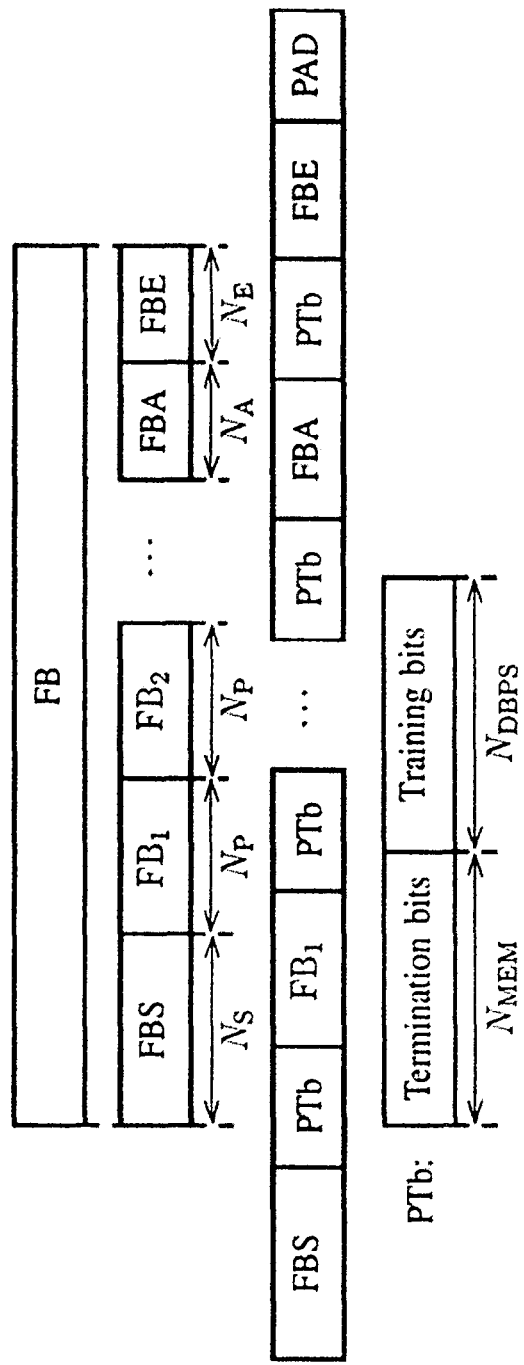
FIG. 6 is a diagram showing the insertion of training bits after the LLC sublayer.

To insert PT training symbols as shown in FIG. 5 a binary vector of length NMEM+NDBPS denoted as PTb is chosen. The first NMEM bits of the sequence terminate the encoder in the known state and the rest of the NDBPS bits correspond to one OFDM training symbol. To ensure that the inserted bits result in a complete OFDM symbol as shown in the figure, the insertion has to be performed at specific positions taking into consideration the interleaver and the other fields added. Since, the scrambling is done in a random fashion unknown to the LLC sublayer the choice of bits in PTb cannot be optimized. For BPSK and QPSK modulation all choices give the same performance. The procedure to insert training bits is described and illustrated in FIG. 12 and FIG. 6. The procedure is valid for any of the MCS specified in ""IEEE standard for information technology—telecommunications and information exchange between systems local and metropolitan area networks—specific requirements part 11: Wireless LAN medium access control (MAC) and physical layer (PHY) specifications," IEEE Std 802.11-2012, pp. 1-2793, 2012, Table 18.4".

All the existing 802.11p systems can transmit the modified packet without undergoing any change in the MAC and PHY layers.

The modified 802.11p frame consists of inserted PT symbols along with the training symbols available in the standard 802.11p frame. The available training symbols can be used in more than one way to obtain the channel estimates for the whole frame.

Figure 3:
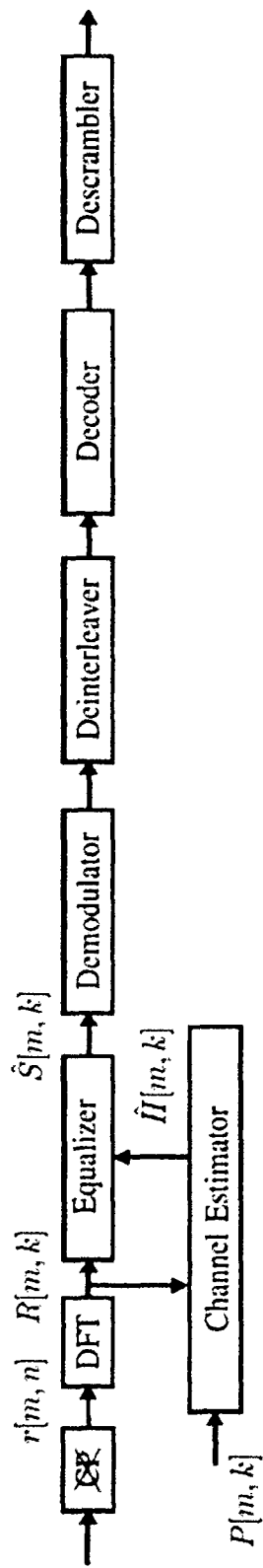
FIG. 3 shows a block diagram of a generic non iterative receiver for 802.11p frame.

A receiver configuration for exploiting the inserted PT training symbols is described. The receiver has the structure similar to the generic receiver shown in FIG. 3 with soft demodulator and soft input Viterbi decoder. Perfect frequency and time synchronization is assumed. The frequency domain symbols obtained after the DFT operation are input to the channel estimation block that outputs the channel estimates for the whole frame. The soft demodulator outputs log-likelihood ratios (LLR) of bits. The LLR values are deinterleaved and input to the soft-input Viterbi decoder.

Figure 7:
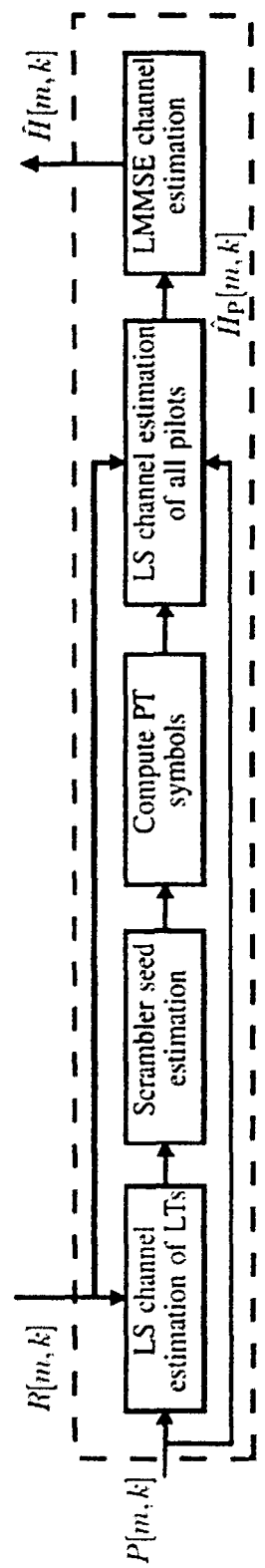
FIG. 7 shows a LMMSE channel estimator for the modified frame.

The channel estimation block is split into several sub-blocks for simplicity as shown in FIG. 7, which shows a LMMSE channel estimator for the modified frame. In the first step LS channel estimates of the two LT symbols are computed and averaged to get less noisy estimates.

The scrambler seed used to initialize the scrambler in the transmitter is necessary for reproducing the inserted PT symbols at the receiver side. The first 7 bits in the SERVICE field correspond to the scrambler initialization. The first several DATA OFDM symbols are equalized with the available LS estimates and the SERVICE field is decoded using Viterbi decoding with trace back. The number of uncoded data bits in the first DATA OFDM symbols chosen for decoding the SERVICE field must be larger than at least five times the constraint length requirement stated in literature to ensure reliability. Using the estimated scrambler seed, PTb binary sequence and period of insertion $M_E'$ the inserted frequency-domain training symbols in PTs are generated using the same procedure as at the transmitter. Subsequently, the LS estimates at the LT, comb pilots and PT positions are computed and input to the LMMSE estimator. The LMMSE estimator computes the channel estimates for all the positions in the frame using the LS estimates and the channel correlation matrices. The LMMSE channel estimates are input to the MMSE channel equalizer.

The least square (LS) estimates of the channel frequency response at pilot positions are given by "O. Edfors, M. Sandell, J.-J. van de Beek, S. K. Wilson, and P. O. Börjesson, "OFDM channel estimation by singular value decomposition," in IEEE 46th Vehicular Technology Conference, vol. 2, 1996, pp. 923-927".

$$\hat{H}_P[m, k] = \frac{R[m, k]}{P[m, k]}, \forall [m, k] \in \mathcal{P}$$

The computed least square estimates are arranged in a column vector $\hat{H}_P$ and the channel estimates for the frame are computed using LMMSE interpolation as in "O. Edfors et al." above $$\hat{H}=R_{HH_P}(R_{H_PH_P}+\sigma_{wf}^2(PP^H)^{-1})^{-1}\hat{H}_P$$

where $\hat{H}$ is the vector of channel estimates at desired positions, P is the diagonal matrix of the pilot symbols; $R_{H_PH_P}=E\{H_P H_P^H\}$ is the auto-correlation matrix of $\hat{H}_P$ and $R_{HH_P}=E\{HH_P^H\}$ is the cross-correlation matrix between $\hat{H}$ and $\hat{H}_P$. The elements of the correlation matrices are obtained from the channel correlation function $$r_H[m,m+\Delta m,k,k+\Delta k]=E\{H[m,k]H^*[m+\Delta m,k+\Delta k]\},$$

where $\Delta m$ and $\Delta k$ are the OFDM symbol and subcarrier separation between the positions for which the correlation is being computed. Under the assumption that the channel is wide-sense stationary with uncorrelated scattering (WS-SUS), the correlation function is separable and can be written as $$r_H[m,m+\Delta m,k,k+\Delta k]=r_t(\Delta m)r_f(\Delta k)$$

where $r_t$ and $r_f$ are the correlation functions in time and frequency domains, respectively. The autocorrelation functions can be estimated using the LS channel estimates at pilot positions or theoretically derived from the underlying channel model.

A. Blockwise MMSE Channel Estimation

Performing the LMMSE interpolation for the whole frame using the above method requires multiplication with large autocorrelation matrices, whose sizes are proportional to the length of the OFDM frame. To reduce the complexity LMMSE interpolation can be performed block-wise. In the block-wise approach, symbols including and between two PTs are considered as a block. LMMSE interpolation for the block is performed by only considering the LS channel estimates available in that block. This approach reduces the size of the correlation matrix considerably and the size of the correlation matrix becomes proportional to size of the block. The reduction in complexity is achieved at the cost of a small degradation in channel estimation in comparison to LMMSE interpolation over the whole frame.

B. Blockwise Decoding

In a standard 802.11p OFDM frame, the frame is terminated with six zero bits for the decoder to terminate in a known state, this enables in decoding the bits at end of the frame reliably. The positions of the inserted training bits in the modified frame are known at the modified receiver and can be used as initial bits and terminating bits of a convolution decoder. This facilitates in decoding the frame in blocks. For decoding the data bits between two PT sequences, the last 6 bits of the preceding PTb sequence serve as the initial bits and the first 6 bits of the following PTb sequence serve as the termination bits. Since the CRC check sum is calculated for the frame including PT sequences at the transmitter, the known PT sequences are multiplexed with the block decoded data bits to form the whole frame for which the added CRC checksum is valid.

Since more bits are decoded with known termination and known bits corresponding to PT are inserted, the overall frame error rate (FER) performance improves in comparison to continuous decoding with trace-back or decoding the whole frame with single termination. It has been observed in the simulations that the block-wise decoding offers performance gain in terms of FER.

The performance of the modified 802.11p frame with the described receiver is evaluated using computer simulations and compared with other receiver configurations decoding the standard 802.11p frame. FER is the focus of our simulation results since it is one of the most important performance metrics for safety related applications. A frame is considered to be in error if the appended CRC checksum does not agree with the check sum computed at the receiver. Modulation and coding scheme with Gray-coded QPSK and code rate 1/2 is used in all the simulations.

The PT training symbols are inserted periodically in the modified frame and the choice of the period is important. Ideally the spacing between the training symbols should be proportional to the coherence time of the wireless channel. However, the safety applications require the 802.11p frames to be broadcast meaning that a transmitted frame reaches several receivers through different channels with different channel impulse responses and relative velocities. The period of PT symbols $M_P'$ can be fixed or made adaptive in which case the transmitter chooses the period and includes it in the transmitted frame. Currently unused bits in the SERVICE field can be used to convey $M_P'$ to the modified receiver.

The channel measurement results in "L. Bernadó, T. Zemen, F. Tufvesson, A. Molisch, and C. Mecklenbräuker, "Delay and doppler spreads of non-stationary vehicular channels for safety relevant scenarios," IEEE Transactions on Vehicular Technology, no. 99, 2013." show that the coherence time of the vehicular channels can be as low as 180 μs and this value can be much lower in case of higher relative vehicular velocities. A spacing $M_P'=8$ DATA OFDM symbols is used between PT training symbols corresponding to a separation of 64 μs for all the simulations unless otherwise mentioned. First 3 DATA OFDM symbols are used to estimate the scrambler seed.

Wireless channel is modeled using exponentially decaying power delay profile (PDP) and Rayleigh fading with Jake's Doppler spectrum for each multi-path component.

The FER results are plotted against $E_S/N_0$, where $E_S$ is the average energy of the frequency domain symbols S[m, k] and $N_0/2$ is the power spectral density of the channel noise such that $N_0=\sigma_{wf}^2$. The rate of the frequency domain symbols S[m,k] does not depend on the MCS used, the length of the frame, or if the transmitted frame is standard or modified. Hence, $E_S$ is proportional to the received power with the same proportionality constant for all MCSs, frame lengths or the type of the frame.

Figure 8:
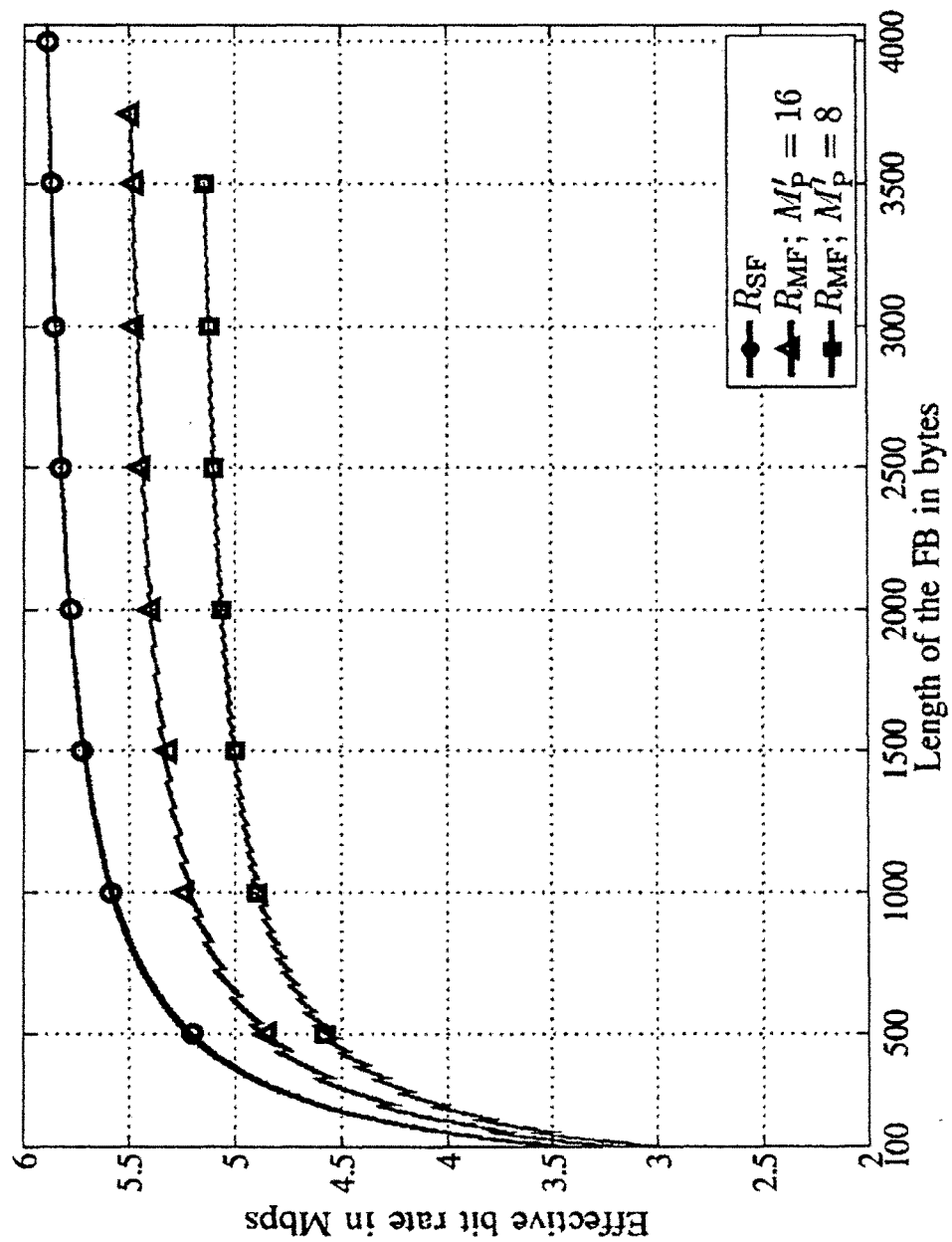
FIG. 8-11 are diagrams showing different comparisons between a modified 802.11p frame and the standard 802.11p frame.

The effect of the overhead introduced by the pilot symbols and cyclic prefix is considered as loss in spectral efficiency. FIG. 8 illustrates effective bit rates of the standard and the modified 802.11p frames with different spacing between the PTs. FIG. 8 shows the effective bit rates of the standard and the modified frames for the MCS 3 i.e., QPSK with rate 1/2 convolutional code. The effective bit rate is calculated as the ratio of the number of bits in the Frame Body to the total time duration of the frame in seconds.

In the simulations the length of the frame body is $N_{FB}=$ (146·8) bits, which results in a standard frame (SF) of M=35 OFDM symbols and a modified frame (MF) of M'=39 OFDM symbols. The modified frame contains one data OFDM symbol after the final PT at end of the frame. The channel estimates of the final PT are used for equalizing the final data OFDM symbol.

Figure 9:
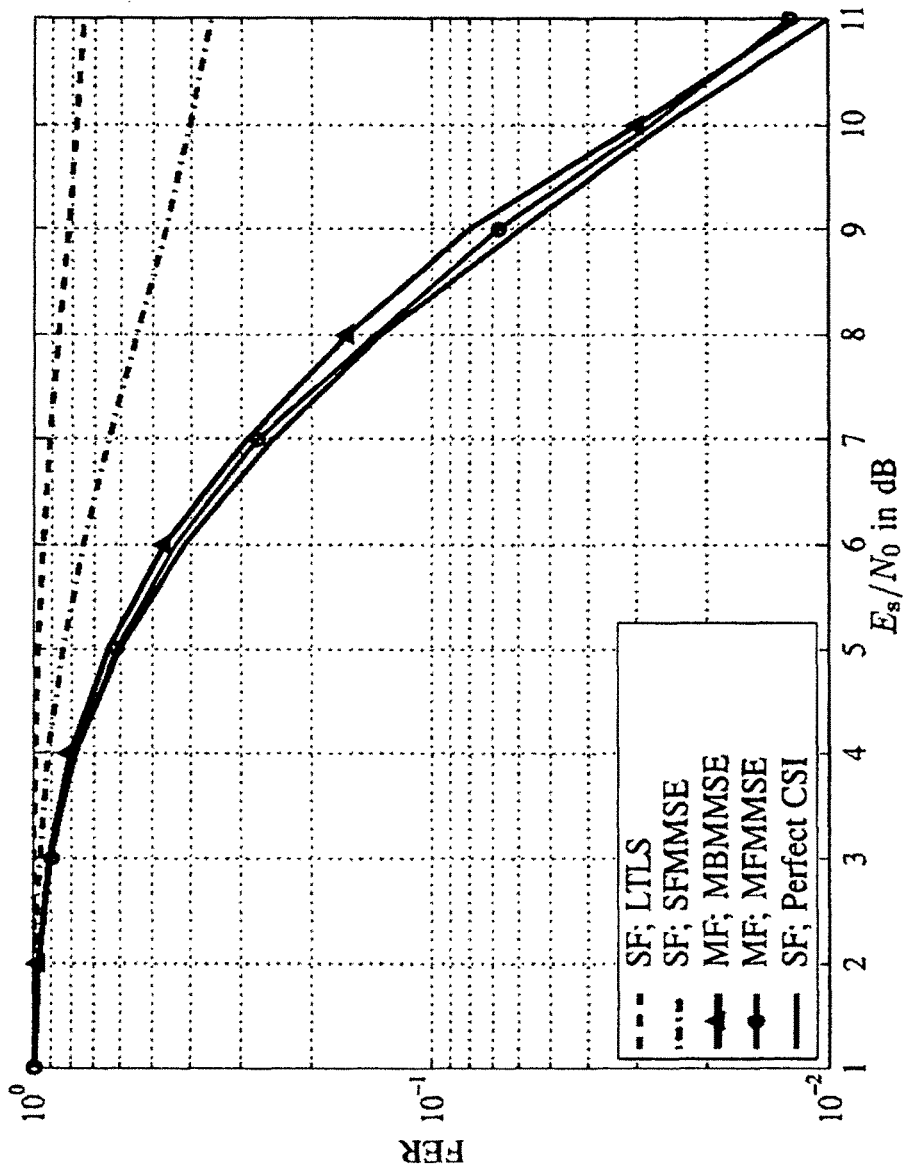

FIG. 9 shows the FER performance of the standard and modified 802.11p frames with different receiver configurations. The channel is modeled with relative vehicular velocity v=100 km/h and exponentially decaying PDP with $\tau_{rms}=0.4$ μs. Frames carry a FB of length $N_{FB}=(146·8)$bits. Relative vehicular velocity v=100 km/h and exponential decay PDP with root mean square (rms) delay spread $\tau_{rms}=0.4$ μs are used for the simulations. Block LS receiver that makes use of the LS channel estimates of the first two LT symbols for decoding the standard frame (LTLS) has the poorest performance. The frame MMSE receiver for the standard frame (SFMMSE) makes use of all the known symbols in the frame for MMSE channel estimation and provides an improved FER performance in comparison to the Block LS method. The frame MMSE with block decoding receiver for the modified frame (MFMMSE) is close to the performance of standard frame with perfect channel estimates (Perfect CSI). The low complexity block MMSE with block decoding receiver for the modified frame (MBMMSE) has slightly higher FER compared to the frame MMSE receiver. To summarize, inserting pseudo PT symbols and using them efficiently can improve the FER performance significantly and performance close to perfect channel estimation can be obtained.

Figure 10:
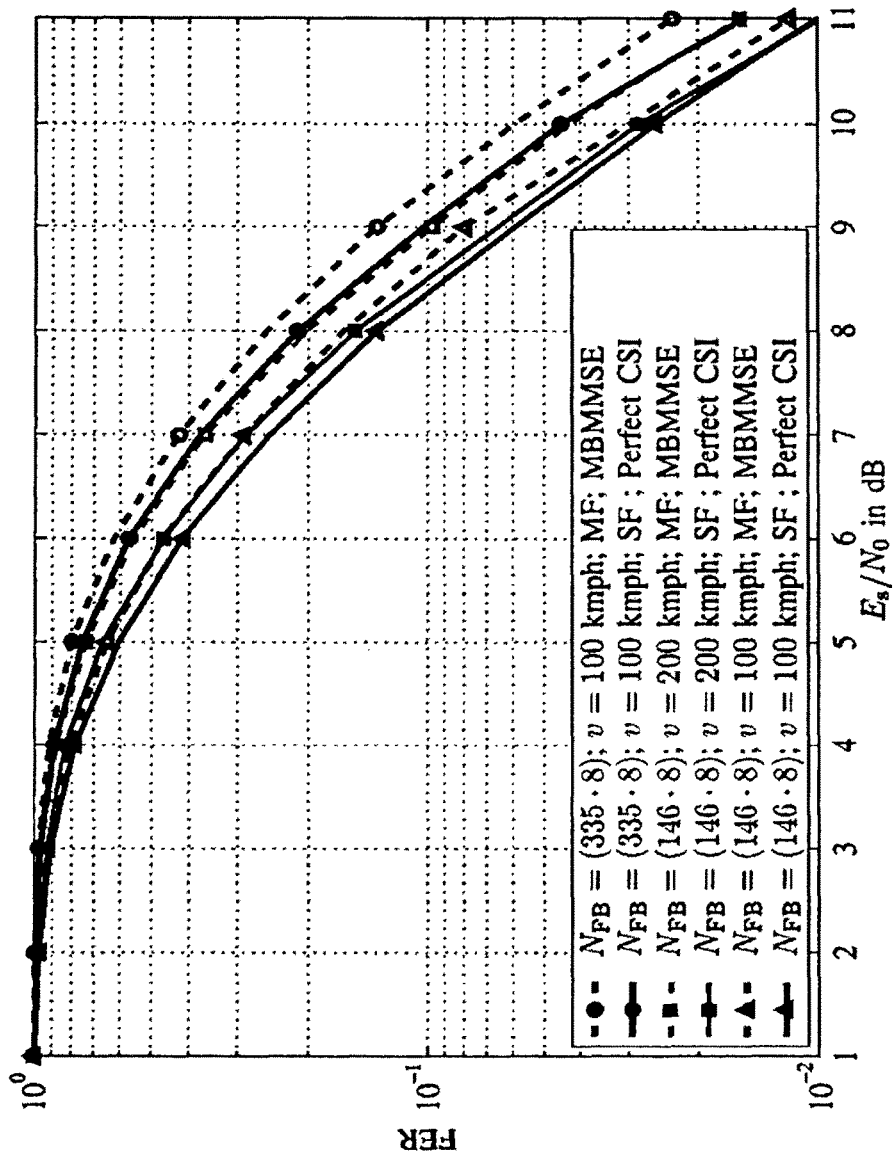

FIG. 10 illustrates the FER of standard and modified 802.11p frames for different packet sizes and relative vehicular velocities using block LMMSE channel estimation with block decoding. The channel is modeled with exponentially decaying PDP with $\tau_{rms}$=0.4 µs. In FIG. 10 the FER performance of the modified frame with different packet lengths and relative vehicular velocities is shown. The rms delay spread of $\tau_{rms}$=0.4 µs is used for all the simulations. Block MMSE channel estimation with block decoding receiver configuration is used for obtaining the results. From the figure it can be observed that the FER performance of the modified packet does not saturate for long packets and high vehicular velocities due to the periodic nature of the inserted PT symbols.

Figure 11:
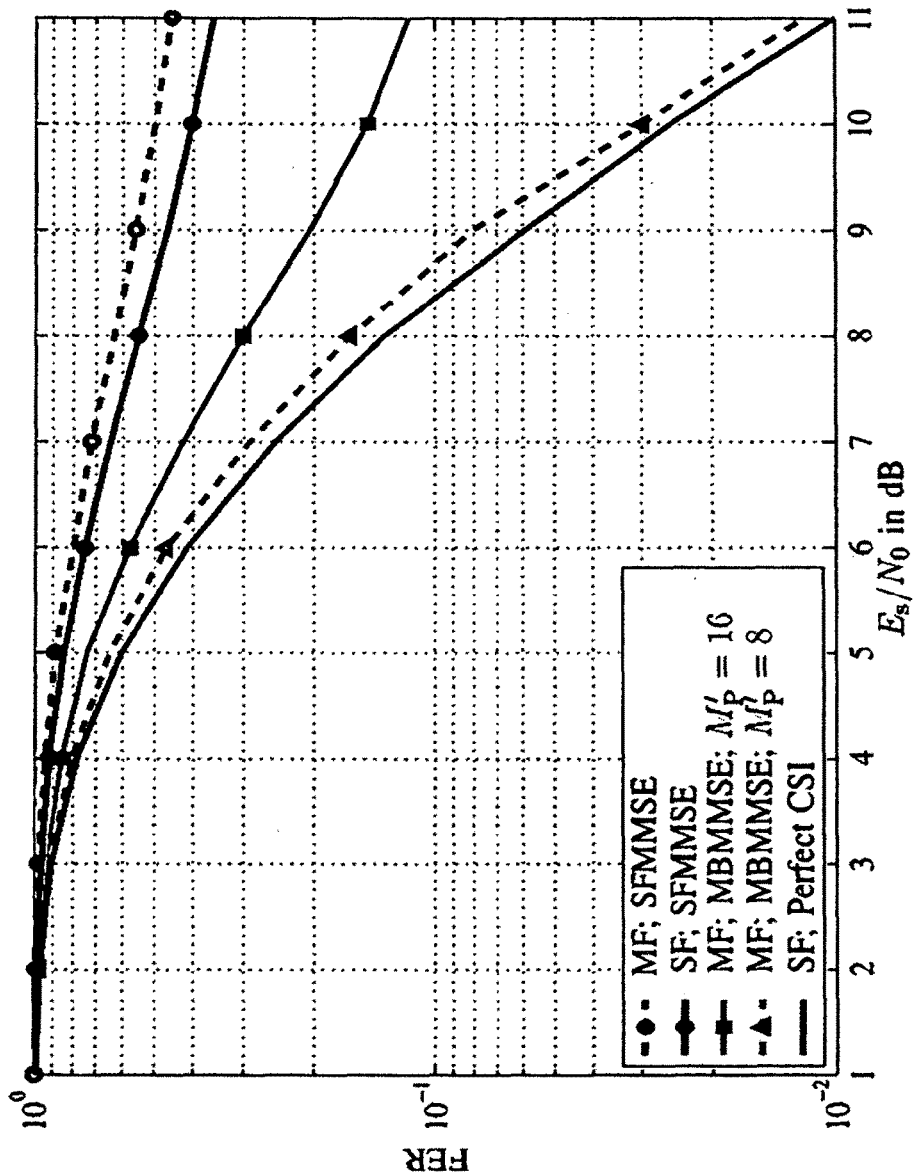

FIG. 11 illustrates the FER of standard and modified 802.11p frames. The channel is modeled with relative vehicular velocity v=100 kmph and exponentially decaying PDP with $\tau_{rms}$=0.4 µs. Frames carry a FB of length $N_{FB}$= (146·8)bits. The effect of longer PT separation or decoding the MF with a standard receiver is seen in the FER curve. FIG. 11 shows the FER results when (i) a modified frame is decoded with SFMMSE, i.e., when the PTs are not used for channel estimation (circles). The loss in performance is due to the fact that modified frame is longer than the standard frame for the same length of FB; (ii) a too large $M_P'$ ($M_P'$=16) is chosen. A larger separation of PTs results in higher MSE of the channel estimation and drastic degradation in FER performance can be seen from the figure (squares) compared to $M_P'$=8.

The invention claimed is:

1. A method for introducing complementing training symbols into an a Orthogonal Frequency-Division Multiplexing (OFDM) frame in a vehicular communications system comprising:

providing a transmitter that sends encrypted information from a first unit to a receiver of a specific second unit or a respective receiver of a number of second units and wherein fixed training symbols, which are implemented in a transmitter chip, are multiplexed with the information and transmitted to the receiver for channel estimation at the receiver side, and inserting the complementing training symbols at the transmitter side immediately after an logical link control (LLC) sub-layer so as to improve channel estimation, where the logical link control (LLC) sub-layer can be modified, and the training bits of the complementing training symbols are inserted in a Frame Body data unit, before passing it down to a medium access control (MAC) sub-layer, as a binary vector of length NMEN bits+NDBPS bits, where the first NMEM bits of the sequence are provided in order to terminate an encoder of the transmitter in a known state, and the rest of the NDBPS bits correspond to one OFDM training symbol, and the insertion is performed at specific positons taking into consideration an interleaver of the transmitter and other fields added.

2. A method according to claim 1, characterized in that training bits of the length $N_{DBPS}$ equal to the number of data bits corresponding to a complete Orthogonal Frequency-Division Multiplexing (OFDM) symbol are inserted periodically in the frame to minimize an overhead of termination and insert training data.

3. A method according to claim 2, characterized in that one complementing training symbol is inserted after the periodically inserted trainings bits to provide for sufficient complementing training symbols for the final OFDM symbols.

4. A method according to claim 2, characterized in that the training bits inserted in the logical link control (LLC) sub-layer are scrambled at the physical (PHY) layer by a scrambler initialized with a pseudo-random seed.

5. A method according to claim 1, wherein the receiver is arranged to reproduce the complementing training symbols.

6. A method according to claim 5, characterized in that the receiver is arranged to use the reproduced complementing training symbols for channel estimation.

7. A method according to claim 5, characterized in that a pseudo-random scrambler seed used to initialize the scrambler at the transmitter side is used for reproducing the complementing training symbols by the receiver.

* * * * *